No. 757,658.

Patented April 19, 1904.

UNITED STATES PATENT OFFICE.

HERMANN HILBERT, OF HEUFELD, GERMANY.

PROCESS OF MAKING GLUE AND GELATIN FROM BONES.

SPECIFICATION forming part of Letters Patent No. 757,658, dated April 19, 1904.

Application filed October 14, 1902. Serial No. 127,260. (No specimens.)

*To all whom it may concern:*

Be it known that I, HERMANN HILBERT, Ph. D., chemist, of Heufeld, Upper Bavaria, in the German Empire, have invented a new and useful Improvement in the Manufacture of Gelatin and Glue from Bones, of which the following is a specification.

In carrying out my improvements bones, such as are usually employed in the manufacture of glue, are either broken to pieces or ground to powder in their raw condition, and the fat is removed by means of suitable solvents, such as benzene, benzol, sulfuric ether, carbon bisulfid, or the like. Then if the bones are merely broken they are roughly ground. The ground and defatted bone material is now treated with a suitable apparatus and means—such as are employed in existing processes, for example—for the removal therefrom of blood, flesh, and other foreign matters. The final stage of the preparatory process consists in the reduction of the bone material to a coarse flour. The flour thus obtained or the flour produced by the grinding of the raw bones is mixed with water in sufficient quantity to form a semifluid mass and is placed in an apparatus in which the mixture can be stirred. There is then added to it hydrochloric acid or a chlorid and gaseous sulfurous acid. The chlorid may be sodium chlorid or another alkali chlorid or a chlorid of an alkaline earth or metal, and the temperature of the mixture may be either high or low. The bone material is thus macerated, and the contained insoluble phosphate of lime is brought into solution, while at the same time a high degree of bleaching is effected. Because of the excess of the sulfurous acid the phosphate of lime from the bones becomes decomposed into free phosphoric acid or acid phosphate of lime and sulfite of lime, respectively, while the chlorid is decomposed into hydrochloric acid and a sulfite of the alkali or alkaline earth or metal. The treatment of the bone material is consequently effected by the two different acids (hydrochloric acid and sulfurous acid) simultaneously. The hydrochloric acid acting to produce easily-soluble salts easily permeates the mass and prepares it for the action of the sulfurous acid, whereby the whole operation is considerably shortened. At the same time the hydrochloric acid acts upon the produced sulfite of lime and converts it into chlorid, whereby sulfurous acid is liberated in the nascent state, in which condition it acts as a most effective bleaching agent far more energetic than merely introduced sulfurous acid. This reaction is the new and important feature of my present invention. The bone material having been treated as described is removed to boilers after a thorough washing, with an addition of a sufficiency of water. In these boilers it is well stirred at a temperature of 100° or upward, the heating being conveniently effected by steam.

The reduction of the bones to the condition of a coarse flour has great utility, since a greater production of gelatin or glue is thereby assured, so that on the completion of the process only about 0.5 per cent. of the nitrogen originally contained in the defatted bones is found in the residue. This important result has not hitherto been obtained in the manufacture of gelatin and glue, inasmuch as the separation of the lime from so comminuted a material could not be carried out in the usual boilers unprovided with stirring apparatus. My improved process for the separation of the glue and gelatine from bones has therefore an important valve.

Having now particularly described and ascertained the nature of my said invention and in what manner the same is to be performed, I declare that what I claim is—

1. The hereinbefore-described process for the production or manufacture of gelatin and glue from bones, which consists in grinding the bones to a coarse flour, subjecting the ground material suspended in water to the simultaneous action of hydrochloric acid and sulfurous-acid gas, washing the material thus treated, and finally heating and stirring the ground and treated material in the presence of water to dissolve out the gelatin or glue, substantially as set forth.

2. The process of producing glue or gelatin from bones, which consists in treating bone-flour while suspended in water, to the simultaneous action of sulfurous acid and hydrochloric acid while agitating the mass, substantially as described.

In testimony whereof I have signed my name to this specification in the presence of two subscribing witnesses.

HERMANN HILBERT.

Witnesses:
HENRY R. McGINNIS,
CLARA I. PARKER.